United States Patent [19]

Yuki et al.

[11] Patent Number: 5,564,053

[45] Date of Patent: Oct. 8, 1996

[54] METHOD FOR GENERATING SPECIFIC PROGRAM SYSTEMS AND TOOLS TO FACILITATE IN GENERATING THE SPECIFIC PROGRAM SYSTEMS

[76] Inventors: Junichi Yuki, 400-120 Joza, Sakura-shi, Chiba, Japan; Fumio Negoro, c/o Institute of Software Scientific Constructions Co., Ltd. 3-10 Shiba 3-Chome, Minato-ku, Tokyo, Japan

[21] Appl. No.: 242,985

[22] Filed: May 16, 1994

[30] Foreign Application Priority Data

May 18, 1993 [JP] Japan .................................. 5-139441

[51] Int. Cl.$^6$ .................................................. G06F 9/06
[52] U.S. Cl. .................................. 395/700; 364/DIG. 1; 364/286
[58] Field of Search ..................................... 395/650, 700

[56] References Cited

U.S. PATENT DOCUMENTS

| | | | |
|---|---|---|---|
| 5,159,687 | 10/1992 | Richburg | 395/700 |
| 5,280,617 | 1/1994 | Brender et al. | 395/700 |
| 5,353,371 | 10/1994 | Honiden et al. | 395/700 |
| 5,414,847 | 5/1995 | Tsukakoshi | 395/650 |

*Primary Examiner*—Thomas M. Heckler

[57] ABSTRACT

The present invention provides a method for generating specific program systems to perform administrative data processing on specially designated businesses with a superior efficiency and less problems regardless of the skill level of engineers engaged in the program development work. Control program FAL excluding the business data processing logic and a program segment ASL including only the business data processing logic are independently generated, and are synthesized to generate the required program. FAL includes link grammar(s) to start ASL. ASL is generated at the cross point defined between the link grammar and the definition item to be treated by the link grammar. FAL is generated by parting FAL into plural processing units, and selecting a FAL-paradigm from a plurality of FAL-paradigm previously extracted, which are used for a basic form common to these parted processing units of FAL. The method is performed by a systematic combination between a leading programmer for managing the whole programming works and a plurality of ordinary programmers under the control of the leading programmer and independently engaged in ASL and/or FAL generating work.

7 Claims, 15 Drawing Sheets

Fig. 12

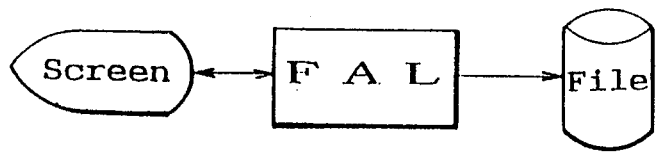

| SEQ | FAL Paradigm | Remarks |
|---|---|---|
| | * | |
| 1 | SEND ?Screen | |
| | * | |
| 2 | RECEIVE ?Screen | |
| | * | |
| | *---------------Check Attribute | |
| | * | |
| 3 | *L, ?Screen, S11, * | check Attribute of Input/Output Definition Set |
| 4 | *L, ?Screen, S41, * | Edit Error in Attribute of Input/Output Definition Set |
| 5 | *L, ?Screen, S42, * | Edit Error in Attribute of Input/Output Definition Set (Non-divided) |
| 6 | *L, ?Screen, S31, * | Compound check Logic-Attribute of Input/Output Definition Set |
| 7 | IF ?Screen - C ='1' MOVE ZERO TO ?Screen - C GO TO OWARI | |
| | * | |
| | ---------------Check Existence of---- | |
| | * | |
| 8 | *L, ?Screen, S21, * | Check Existence of Input/Output Definition Set |
| 9 | *L, ?Screen, S43, * | Edit Error in Existence of Input/Output Definition Set |
| 10 | *L, ?Screen, S44, * | Edit Error in Existence of Input/Output Definition Set(Non-divided) |
| 11 | *L, ?Screen, S32, * | Compound check Existence Allowance of Input/Output Definition Set |
| 12 | IF ?Screen - C ='1' MOVE ZERO TO ?Screen - C GO TO OWARI | |
| | * | |
| | *---------------Check Input Item | |
| | * | |
| 13 | *L, ?Screen, S33, * | Check Input Item of Input/Output Definition Set |
| 14 | *L, ?Screen, S45, * | Edit Error in Input Item of Input/Output Definition Set |
| 15 | *L, ?Screen, S46, * | Edit Error in Input Item of Input/Output Definition Set(Non-divided) |
| 16 | *L, ?Screen, S34, * | Compound check Logic Formula Identification of Input/Output Definition Set |
| 17 | IF ?Screen - C ='1' MOVE ZERO TO ?Screen - C GO TO OWARI | |
| | * | |
| | *---------------Edit File | |
| | * | |
| 18 | *L, ?File, S47, * | Edit Output Definition Set (Non-divided) |
| 19 | WRITE ?File | |
| 20 | OWARI EXIT | |

| Item<br>Link Grammar | Item 1 | Item 2 | Item 3 | ... | Item n |
|---|---|---|---|---|---|
| Link Grammar 1 | ASL 1,1 | ASL 1,2 | ASL 1,3 | ... | ASL 1,n |
| Link Grammar 2 | ASL 2,1 | ASL 2,2 | ASL 2,3 | ... | ASL 2,n |
| : | : | : | : | : | : |
| Link Grammar n | ASL n,1 | ASL n,2 | ASL n,3 | ... | ASL n,n |

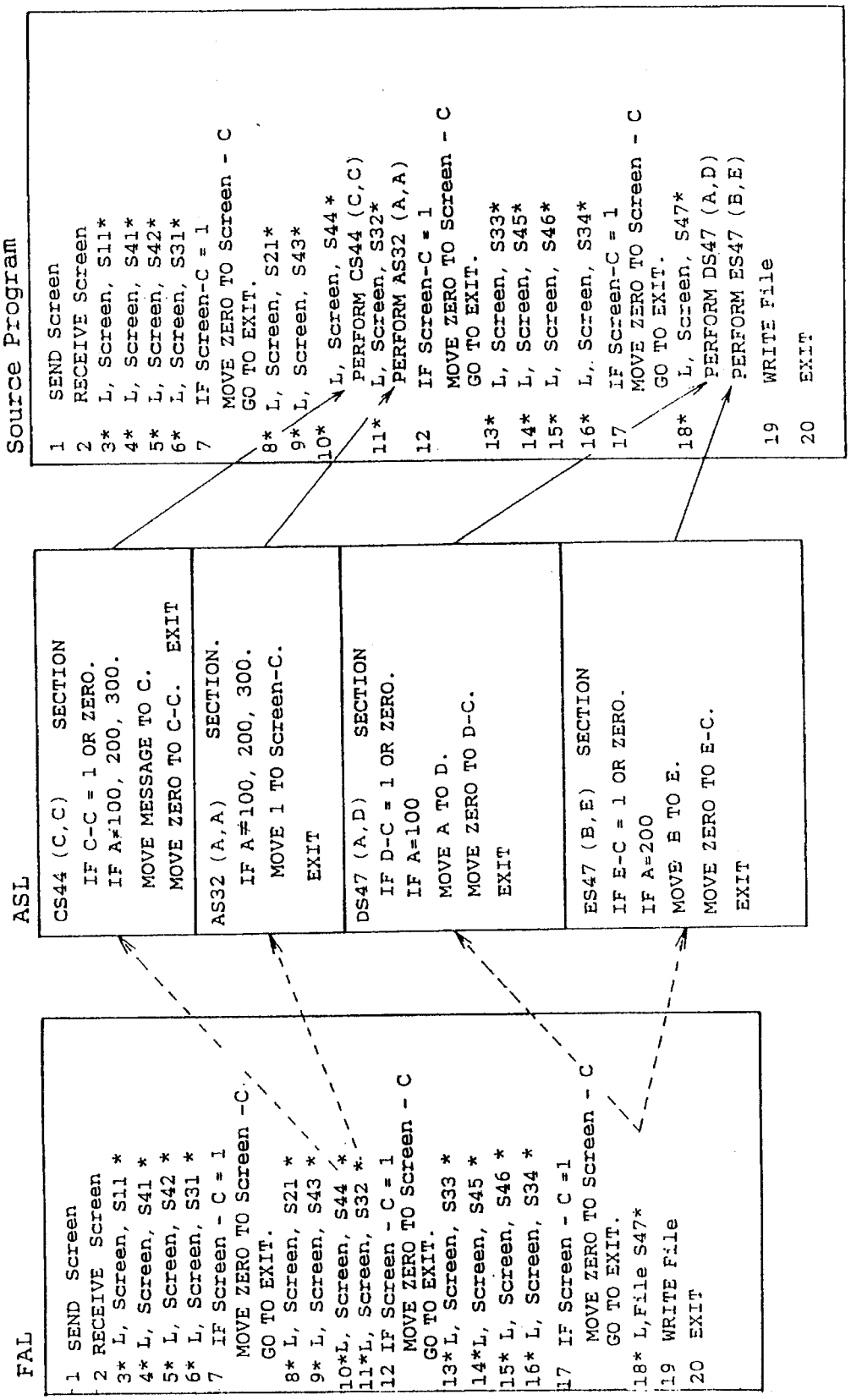

METHOD FOR GENERATING SPECIFIC PROGRAM SYSTEMS AND TOOLS TO FACILITATE IN GENERATING THE SPECIFIC PROGRAM SYSTEMS

BACKGROUND OF THE INVENTION

1. Field of the Invention

The present invention relates generally to a method of generating specific programming systems to perform administrative data processing operations in specially designated businesses by means of at least one computer. Further, the invention also relates to tools to facilitate the above described program system generating works.

2. Description of the Prior Art

Conventionally, various techniques of computer-program design have been proposed and broadly known as, for example, module design technique, hierarchical programming technique, abstract-data using technique, Jackson technique, and so on. Although these conventional program design techniques have produced excellent theoretical results in laboratories, they have not been practically applied in an actual working scene where specific programs for specially designated businesses are produced. In other words, these techniques have not been proven for direct use by programmers on the scene. Thus, in an actual software development scene, some programmers whose skill level and technical knowledge vary widely have been engaged in program design depending on their own skill level and experience.

On most conventional program development scenes, an individual programmer designs a new program in isolation according to his own technical level without any programming schemes. Therefore, such isolated programming work is not only performed at a low efficiency, but may also cause remarkable variation in quality of the produced programs. This variation will cause many serious problems in system management because many corrections and anxious maintenance will be required.

For example, in development and design work of specific programs for specially designated businesses which perform administrative data processing in sales management, production management, stock management, purchase management, financial management, personnel management, and so on, the basically designed program should be corrected to fit the specially designated business. Such correction is achieved by considering and investigating the required specification in response to the designated business. Practically, most programmers proceed into the detailed design of the program when there are still many indeterminate factors needing to be resolved with respect to the requested business data processing logic. The situation may cause the programmers confusion when handling at the same time the problems that deal not only with the program control logic but also with the business data processing logic. Even when a programmer is free from such confusion, he is often obliged to return to the initial stage during the program design work stages, for example, due to partial change in the requested specification. On account of this situation, the ongoing program design work cannot be flexibly adapted to any unexpected changes in the requested specification. Conventionally, the detailed logic program already produced must be often corrected in response to the changes. These repeated correction works will reduce the efficiency in programming work. In addition to the problems in programming work, the program created through the conventional programming system having the above disclosed demerits may also cause many serious problems in maintenance and correction works by users who intend to apply the program to perform administrative data processing.

BRIEF SUMMARY OF THE INVENTION

Therefore, it is an object of the present invention to provide an improved method for generating specific programming systems to perform administrative data processing on specially designated businesses which overcomes the above described conventional problems.

Another object of the present invention is to provide an improved method for generating specific program systems to perform administrative data processing on specially designated businesses, which allows any programmer or system engineer to operate easily without any problems.

A further object of the present invention is to provide an improved method which can generate specific program system to perform administrative data processing on specially designated businesses at an excellent efficiency regardless of the skill level of the programmers or system engineers.

Still a further object of the present invention is to provide tools to facilitate the above described specific program system generating works.

To accomplish the above described objects, the method for generating specific program systems to perform administrative data processing on specially designated businesses according to the present invention basically comprises an extracting step for extracting various definition items to be processed in this administrative data processing system; an ASL generating step for generating program segments ASL (Applicational Segment of Logic, hereinafter, referred to as "ASL" or "program segment ASL") each of which has a single function, and is related to the above extracted definition item as a key-word and independent from the control relation of the other program segments ASL; a FAL generating step for generating control program FAL (Frame of Applicational Logic, hereinafter, referred to as "FAL" or "control program FAL") which organically combines plural program segments ASL by operating and controlling a group of the generated program segments ASL; and a synthesizing step for synthesizing the above generated program segments ASL and control program FAL to create a source program to satisfy the required administrative data processing function.

In the above method, according to the first aspect of the present invention, the above mentioned control program FAL has at least one link grammar for starting the above mentioned program segments ASL, and each of the above mentioned program segments ASL is generated at a cross point defined between the link grammar and the definition item to be treated by the link grammar.

In the above method, according to the second aspect of the present invention, the above mentioned FAL generating step is performed by separating the control program FAL into plural processing units, and selecting a FAL-paradigm from a plurality of FAL-paradigm previously extracted, which are used for a basic form common to these parted processing units of the control program FAL.

In this method, according to the third aspect of the present invention, the above mentioned ASL and FAL generating steps are performed by systematic control work in combination with a leading programmer for managing the whole programming works and a plurality of ordinary programmers under the control of the leading programmer and independently engaged in the ASL generating work and/or FAL generating work.

Further, the present invention provides tools adapted for the described method. That is, the tools are configured to facilitate the ASL and FAL generating works. The tools include a first type for the leading programmer and a second type for the ordinary programmer. The first type tool is used to instruct each working content for the ordinary programmer. The second type tool is used to perform the ASL and/or FAL generating work instructed by the first type tool, and collect the result of the work and return the collected result to the first type tool. The tools are configured by soft ware means and/or hardware means.

The method for generating specific program systems to perform administrative data processing operations in specially designated businesses according to the present invention, as disclosed above, may provide the following functions and advantages.

Since the programming work according to the present invention can be achieved by separating the control program FAL, which excludes business data processing logic from the program segment ASL, which includes only business data processing logic, respective structures of the control program FAL and program segment ASL are remarkably simplified, and the FAL generating work and the ASL generating work can progress independently.

Since most changes required during program-development or after the practical work belong to business data processing, such changes can be easily performed by only correcting corresponding program segment ASL.

Since the program segment ASL is generated at the cross point defined between the link grammar of the control program FAL and the definition item to be treated by the link grammar, the programmer will routinely know the program segment ASL to be generated. This allows a programmer to easily perform ASL programming work without mistakes and fluctuation.

Since the control program FAL is generated in accordance with the FAL-paradigm which is selected from a plurality of predetermined FAL-paradigm, the FAL generating work can be easily standardized and simplified to ensure uniform programming.

Since each of the program segments ASL and control programs FAL can be independently generated by a systematic control work in combination with a leading programmer for managing the whole programming works and a plurality of ordinary programmers under the control of the leading programmer, these ordinary programmers can effectively create only the required program segment ASL and/or control program FAL program in response to the instruction from the leading programmer.

Other and further objects of this invention will become obvious upon an understanding of the illustrative embodiments about to be described or will be indicated in the appended claims, and various advantages not referred to herein will occur to one skilled in the art upon employment of the invention in practice.

BRIEF DESCRIPTION OF DRAWINGS

FIG. 12 is a representation of one example of a FAL paradigm;

FIG. 16 is a schematic illustration showing an example of a system for generating a source program by synthesizing control programs FAL and program segments ASL.

Figure 1:
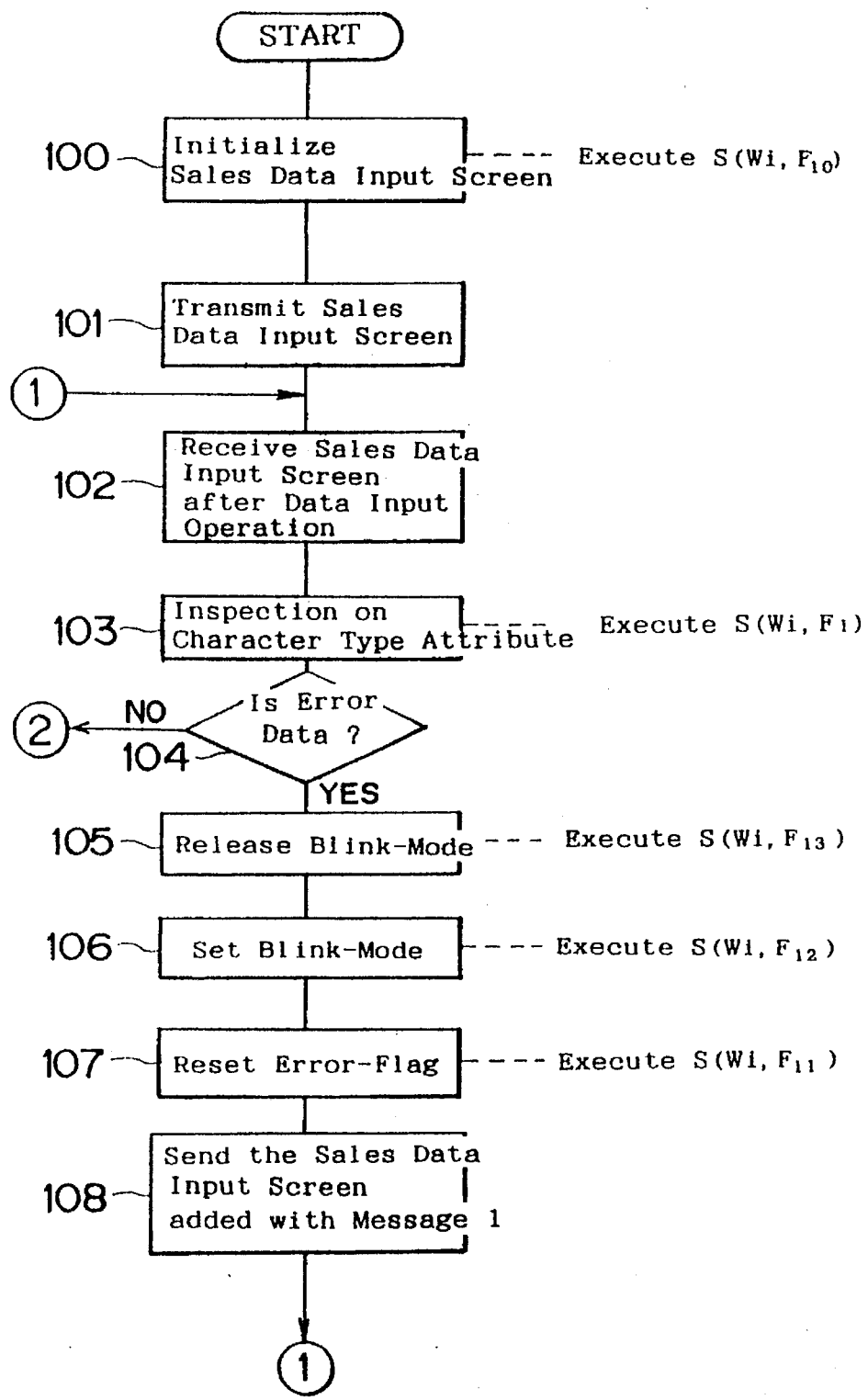
FIG. 1 is a flowchart representing one example of control program "FAL" according to the present invention.

DETAILED DESCRIPTION OF THE PREFERRED EMBODIMENT A preferred embodiment of the present invention will be described in detail in conjunction with the accompanying drawings.

The control logic FAL (Frame of Applicational Logic) is composed of two factors, one of which is a branch route classification logic and the other is a link grammar for starting business data processing logic (program segment ASL). Also the control program FAL can control the definition set. Since the control program FAL does not include business data processing logic at all, its logic design is simplified.

The program segment ASL (Applicational Segment of Logic) is related only to business data processing. The definition items which indicate the names of the items respectively attributed to various data items to be processed are extracted. Then one program segment having a single function is generated for each of the definition items by using the extracted definition item as a key-word. The generated segment is independent from the control relation of the other segments. Thus the generated segments ASL are ordered by the control program FAL.

As disclosed above, the method according to the present invention is based on the concept of a development process in programming work; that is, the programming scheme of this method is constructed in a two-strata configuration, the first stratum of which is the control logic (control program FAL) and the other is the business data processing logic (program segment ASL). The control program FAL excludes the business data processing logic, and the program segment ASL includes only the business data processing logic and are independently generated, and these generated programs are synthesized to generate the required program.

This two-strata configuration is based on three concepts; definition set, control program FAL and program segment ASL. The definition set includes a plurality of definition items (business words) gathered from a specific range. The control program FAL depends on the definition set and the program segment ASL depends on the definition items attributed to the definition set. Detailed determination on these three concepts can be independently performed at the same time. They are synthesized to generate the required program. The definition set means one of the following seven types; i.e., screen, book, data file, master file, common table, FAL individual table, and ASL individual table.

As disclosed above, since the programming scheme of this method is constructed in a two-strata configuration of FAL-program stratum independent from the content of the data item, and ASL-program stratum depending on each definition item relating to the content of each data item, the FAL-program stratum is free from complicated data processing on definition item varying widely. Therefore, the program structure of the FAL-program stratum is simplified to be easily understood and independent from the request for changing the initially required specification in detail. This results in extremely improving the production efficiency and quality of the FAL-program stratum.

On the other hand, the ASL-program stratum includes a set of small scale program segments each of which is independent from each other and has a single function depending on the definition item as a key word. Thus, the logic content of each segment is remarkably simple so that it can be easily created with good quality. Further, in order to adopt detailed changes in the required specification, correction work on only corresponding program segment is carried out without any discussion on the whole program.

One preferred embodiment of the programming process to embody the administrative data processing system on the following required specification will be disclosed to make clear the merits of the above described method.

REQUIRED SPECIFICATION

Process for Collecting Sales Data

Firstly, a sales data input screen is displayed on a display device, and sales data is input into the screen. Information after the input work is received and subjected to a validity check. If valid, the information data is processed through a predetermined editing and then written into a sales file.

Process for Creating Book

An operation screen is displayed on the display device. Sales data aggregated date is input through the operation screen. The sales information up to the aggregated date is edited from the sales file and thus edited information is output to a book.

In this required specification, the sales data input screen and the sales file include 10 data items as follows.

| W1: sales date | W2: article code |
| W3: article name | W4: price |
| W5: amount | W6: sales income |
| W7: sum of sales income | W8: shop code |
| W9: shop name | W10: a number of shops |

The above ten data items correspond to the definition item collected and extracted from the processing system to be applied.

On each of the ten definition items Wi(i=1 to 10), a program segment having a single function corresponding to the following classification of function is generated in a form of the corresponding definition item Wi as a key word, and the program segments are respectively independent from the control relation of the other segments. Thus generated program segments are represented as ASL.

One program segment ASL relating to one function Fj corresponding to one definition item Wi is represented by S(Wi, Fj).

The program segment ASL, S(Wi, Fj), will be described in their respective functions.

F1: Inspection on Character Type Attribute, S(Wi, F1)

In this program segment, one input data relating to one definition item Wi is determined whether its character type attribute is coincident with a designated attribute or not.

For example, when it is prescribed that a definition item W3 "Article Name" is represented by Katakana, one type of Japanese characters, one program segment ASL represented by S(W3, F1) determines whether input data of "Article Name" is attributed to Katakana or not. If yes, the input data is valid and if no, the input data is invalid. Such a program segment is generated on respective ten definition items. This type of program segment s(Wi, F1) is processed in order that the definition item data to be processed is firstly input, character type attribute inspection on the input data is carried out, and an error flag E(Wi, F2) corresponding to the definition item is turned on when the inspected result is not normal.

F2: Inspection on a Number of Figures, S(Wi, F2)

In this program segment, one of the input data relating to one definition item Wi is determined whether a number of figures of the input data is equivalent to or less than a designated number.

For example, a number of figures of "Sales Date" of the definition item W1 is equivalent to 1 or 2 when the input data is normal. That is, one program segment ASL represented by S(W1, F2) is to determine whether or not a number of figures of the input data relating on "Sales Date" is equivalent to 2 or 1. If yes, the input data is valid, and if no, the data is invalid. This program segment is generated on respective 10 definition items. This type program segment S(Wi, F2) is processed in order that the definition item data to be processed is firstly input, the inspection on a number of figures of the input data is carried out, and an error flag E(Wi, F2) corresponding to the definition item is turned on when the inspected result is not normal.

F3: Inspection on Allowance of Existence, S(Wi, F3)

In this program segment, one of the input data relating to one definition item Wi determines whether the input data exists in a designated definition table. The definition table is formed in a master file, common table or individual tables in response to business factors.

For example, various codes effective for "Article Code" of definition item W2 are collected in a definition table of the common table. In one program segment ASL represented by S(W2, F3), one data of "Article Code" determines whether it exists in the definition table or not. If yes, the data of "Article Code" is valid, and if no, the data is invalid. This program segment is generated on the respective 10 definition items. This type of program segment S(Wi, F3) is processed in order that the definition item data to be processed is firstly input, the corresponding definition table is read, the input data is compared with the read definition table, and an error flag E(Wi, F3) corresponding to the definition item is turned on when the compared result is not normal.

F4: Inspection on Logic between Data, S(Wi, F4)

This program segment determines whether one logic relation between one input data relating to one definition item Wi and the other designated item data (not only single) satisfies predetermined conditions.

For example, when one business factor is represented that "sales income" is identified to the multiplication result of "price" by "amount", one program segment ASL represented by S(W6, F4) on the definition item W6 "sales income" determines whether or not the multiplication result of "price" data of the definition item W4 by "amount" data of the definition item W6 is equivalent to "sales income" data of the definition item W6. This program segment is generated on the respective 10 definition items. This type of program segment S(Wi, F4) is processed in order that one definition item data Wi and another designated item data are obtained, the inspection on logical identification between these data is carried out, and an error flag E(Wi, F4) corresponding to the definition item is turned on when the inspected result is not normal.

F5: Input Data Registering Process, S(Wi, F5)

In this program segment, one input data of one definition item Wi is stored in the designated place(s) in the individual table AT, common table CT, master file MF, and data file DF. This program segment will be generated on the respective 10 definition items.

F6: Internal Data Transferring Process, S(Wi, F6)

In this program segment, one (or plural) internal data (stored in the individual table AT, common table CT, master file MF, and data file DF) of one definition item Wi is copied or transferred to the other designated place(s) in one or more of the individual table AT, common table CT, master file MF, and data file DF. This type of program segment will be generated on the respective 10 definition items.

F7: Processing between Input Data, S(Wi, F7)

One input data relating to one definition item Wi and the other input data (not only one) relating to the other definition item Wn are operated on in a designated manner, and the operated result(s) is (are) stored in the designated place(s) in one or more of the individual table AT, common table CT, master file MF, and data file DF. This type of program segment will be generated on respective 10 definition items.

F8: Processing between Input Data and Internal Data, S(Wi, F8)

One input data relating to one definition item Wi and one or more internal data relating to the other designated definition item Wn (stored in the individual table AT, common table CT, master file MF, and data file DF) are operated on in a designated manner. Then the operated result(s) is (are) stored in the designated place(s) in one or more of the individual table AT, common table CT, master file MF and data file DF. This type of program segment will be generated on respective 10 definition items.

F9: Processing between Internal Data, S(Wi, F9)

One internal data relating to one definition item Wi (stored in the individual table AT, common table CT, master file MF, and data file DF) and the other internal data (not only one) relating to the other definition item Wn (stored in the individual table AT, common table CT, master file MF, and data file DF) are operated on in a designated manner, and the operated result(s) is (are) stored in designated place(s) in one or more of the individual table AT, common table CT, master file MF, and data file DF. This type of program segment will be generated on the respective 10 definition items.

F10: Initialization Process, S(Wi, F10)

In this program segment, a designated initial value is set in an input area (an designated item of the data input screen on a display device) relating to one definition item Wi. This type of program segment will be generated on the respective 10 definition items.

F11: Error Flag Resetting Process, S(Wi, F11)

In this program segment, the error flag E(Wi, Fj) turned on by executing the above described program segments F1, F2, F3, and F4 relating to one definition item Wi is reset to off. This type of program segment will be generated on the respective 10 definition items.

F12: Blink-Mode Set On Process, S(Wi, F12)

In this program segment, when the above described error flag E(Wi, Fj) relating to one definition item Wi is kept in the on-mode, the data display area for the definition item Wi blinks. This type of program segment will be generated on the respective 10 definition items.

F13: Blink-Mode Set Off Process, S(Wi, F13)

In this program segment, the data display area for the definition item Wi in the blink on-mode in the program segment F12 is returned to an ordinary display mode. This type of program segment will be generated on the respective 10 definition items.

Thus generated respective program segments ASL are independent from control relation of the other program segments ASL, each of which has a single definition item as a key word. If one program segment ASL is not required for one business data processing, the program segment may not be generated. If the judgment on this requirement is not smoothly performed, it is more effective rather than the partially eliminating formation to routinely create all possible program segments ASL.

Next, the control program FAL for organically combining and controlling the above described program segments ASL will be described.

One control program FAL is generated for each process unit defined by business conception such as transaction, job, or the like. In this embodiment, the required specification includes the first half of the process for collecting sales data and the latter half of the process for outputting the processed data to the book. For each one of these two processes, one control program FAL is created.

Figure 2:
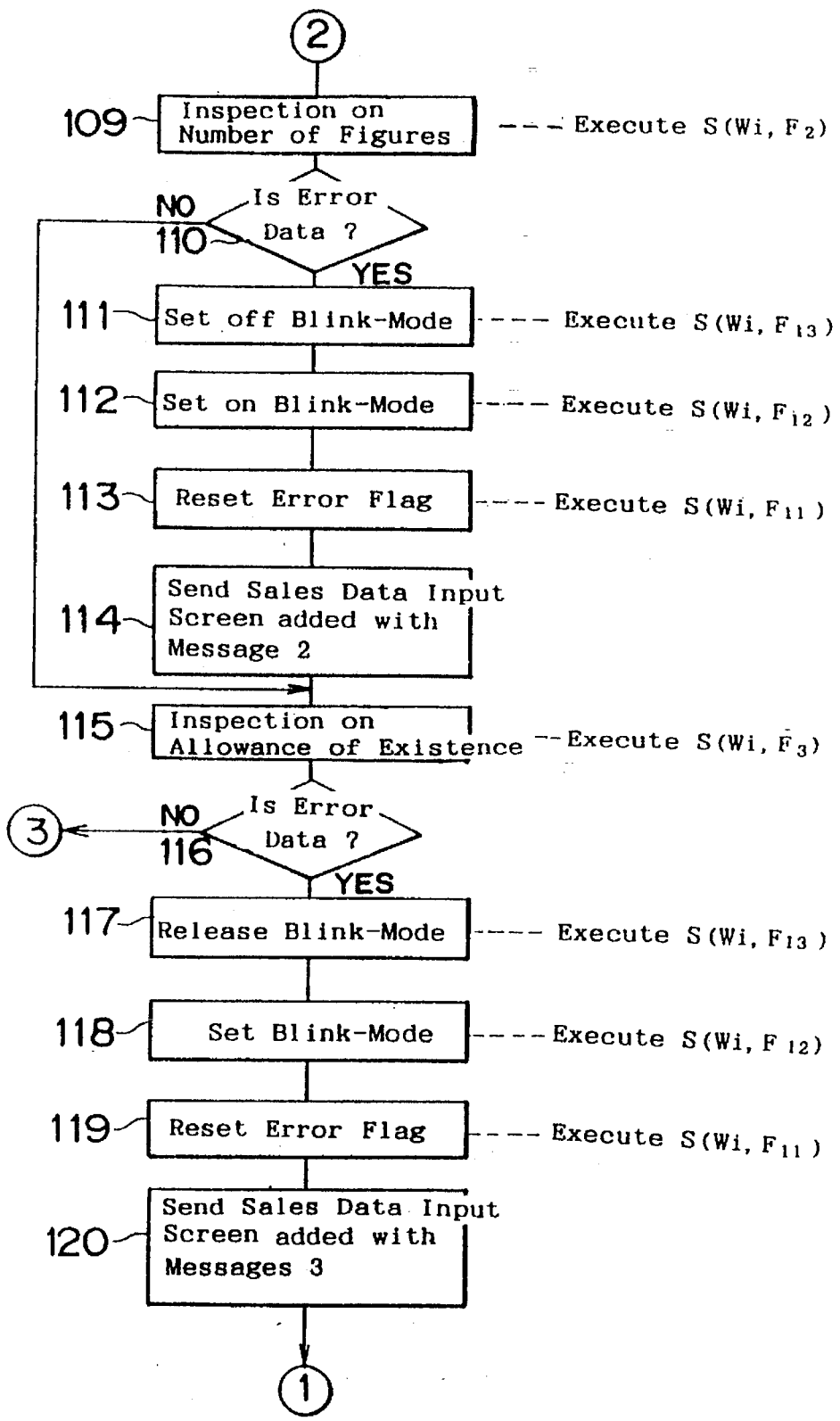
FIG. 2 is a flowchart continued from FIG. 1.
Figure 3:
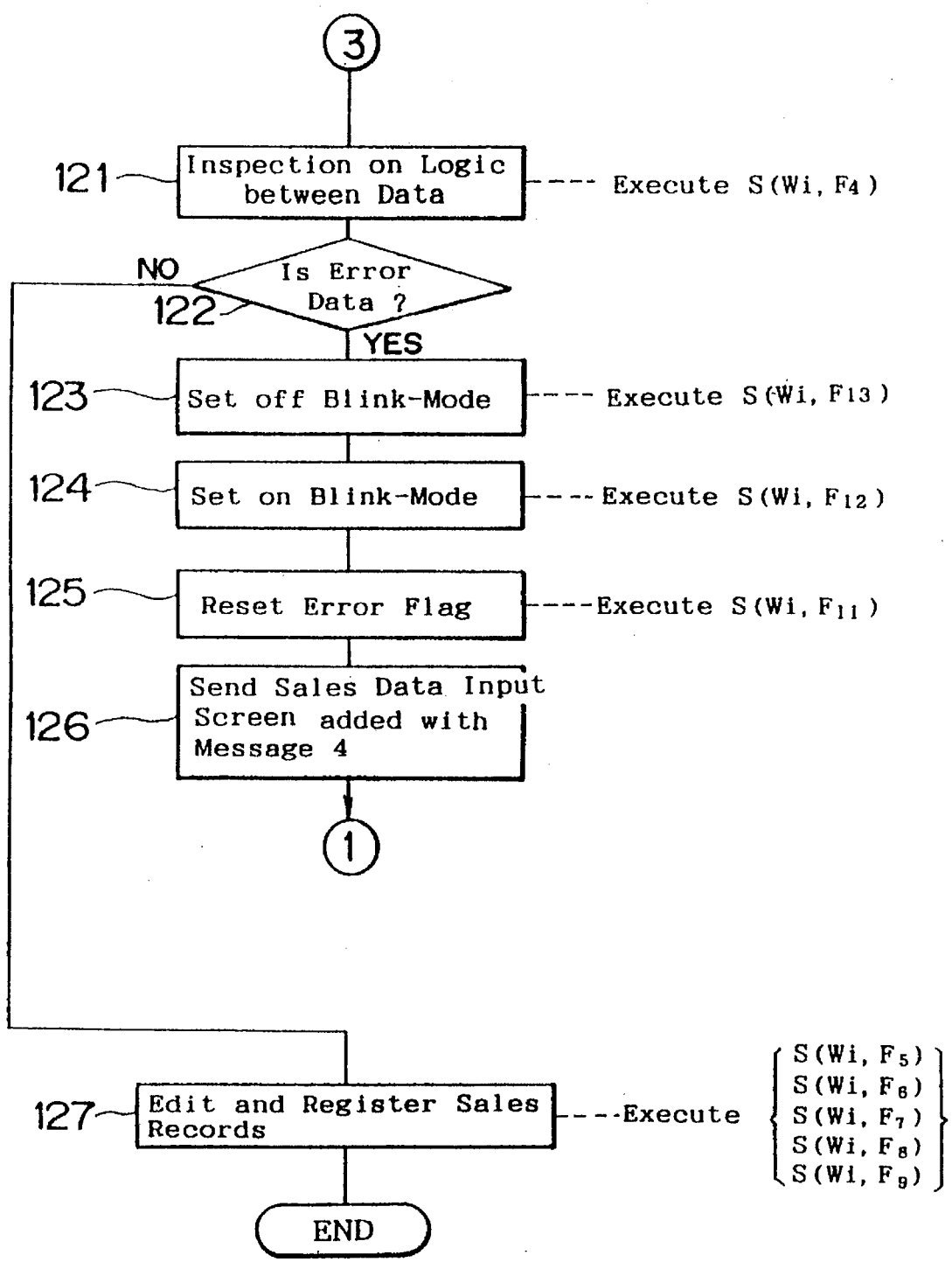
FIG. 3 is a flowchart continued from FIG. 2.

One example of control program FAL is represented by the flowcharts shown in FIG. 1 to FIG. 3. This program was created to execute the process for collecting sales data. That is, a sales data input screen is displayed on a display device and sales data is inputted into the screen; the information after the input work is received and subjected to validity check; if valid, the information data is processed through a predetermined editing and then written into a sales file.

Referring to FIG. 1 to FIG. 3, in the first step 100 initial values are set in respective items in the sales data input screen. This operation is performed by executing the program segment ASL represented by S(Wi, F10) for the initialization process.

In step 101, the initialized sales data input screen is transmitted to the terminals.

In step 102, the sales data input screen after the data input operation is sent from the terminals is received and the received data is then processed in the following steps.

In step 103, the received input data relating to each definition item Wi is subjected to the inspection on character type attributes. This inspection work is performed by executing the program segment ASL represented by S(Wi, F1) for the inspection on character type attribute, on each definition item. If yes, that is, if this inspection detects at least one error data, then an error flag E(Wi, F1) corresponding to the error detected definition item is turned on. If no, that is, if the above described inspection does not detect an error data at all, then the process proceeds from step 104 to step 109 of the flowchart shown in FIG. 2.

In step 109, the inspection on a number of figures of the input data is executed. This operation is performed by executing the above described program segment ASL represented by S(Wi, F2) on each definition item. If yes, that is, if this inspection detects at least one error data, then an error flag E(Wi, F2) corresponding to the error detected definition item is turned on. If no, that is, if the above described inspection does not detect an error data at all, then the process proceeds from step 110 to step 115.

In step 115, the inspection on allowance of existence is executed. This operation is performed by executing the above described program segment ASL represented by S(Wi, F3) on each definition item. If yes, that is, if this inspection detects at least one error data, then an error flag E(Wi, F3) corresponding to the error detected definition item is turned on. If no, that is, if the above described inspection does not detect an error data at all, then the process proceeds from step 116 to step 121 of the flowchart shown in FIG. 3.

In step 121, the inspection on logic between data is executed. This operation is performed by executing the above described program segment ASL represented by S(Wi, F4) on each definition item. If yes, that is, if this inspection detect at least one error data, then an error flag E(Wi, F4) corresponding to the error detected definition item is turned on. If no, that is, if the above described inspection does not detect an error data at all, then the process proceeds from step 122 to step 127.

In step 127, the sales records are edited and then registered in at least one of either the individual table AT, common table CT, master file MF, or data file DF. This operation is performed by executing the above described program segments ASL represented by S(Wi, F5) for input data registering process; S(Wi, F6) for internal data transferring process; S(Wi, F7) for processing between input data; S(Wi, F8) for processing between input data and internal data; and S(Wi, F9) for processing between internal data.

Up to this step, the sales data collecting process has been completed.

On the other hand, in step 103, when the input data relating to the definition item Wn subjected to the inspection on character type attribute is detected as an error and then an error flag E(Wn, F1) is turned on, the process proceeds from step 104 to step 105.

In step 105, the program segment ASL represented by S(Wi, F13) for each definition item is executed to perform the blink-mode releasing process. After this step, the program segment ASL represented by S(Wi, F12) for each definition item is executed in step 106 to perform the blink-mode setting process. Then in response to the error flag(Wn, F1) turned on, blink control information is added to the data display area of the corresponding definition item Wn.

In step 107, the program segment ASL represented by S(Wi, F11) is executed to perform the error flag resetting process so that the error flag is initialized.

In step 108, the sales data input screen added with a message 1 representing data error is detected is sent back to the terminals. Then the process is returned to step 102 and restarted to perform the above described routine again.

Furthermore, the same routine will be executed as shown in the flowcharts when an error data is detected in the inspection on the number of figure, inspection on allowance of existence, and inspection on logic between data.

The above described control program FAL does not include contents of the program segments ASL, but has the link grammar for calling only program segment ASL represented by S(Wi, Fj) to be processed. Finally, the control program FAL and the program segment(s) ASL are synthesized to generate the object source program.

Next, in order to apply the above described method to various program developments, effective and detailed methods will be described.

Figure 4:
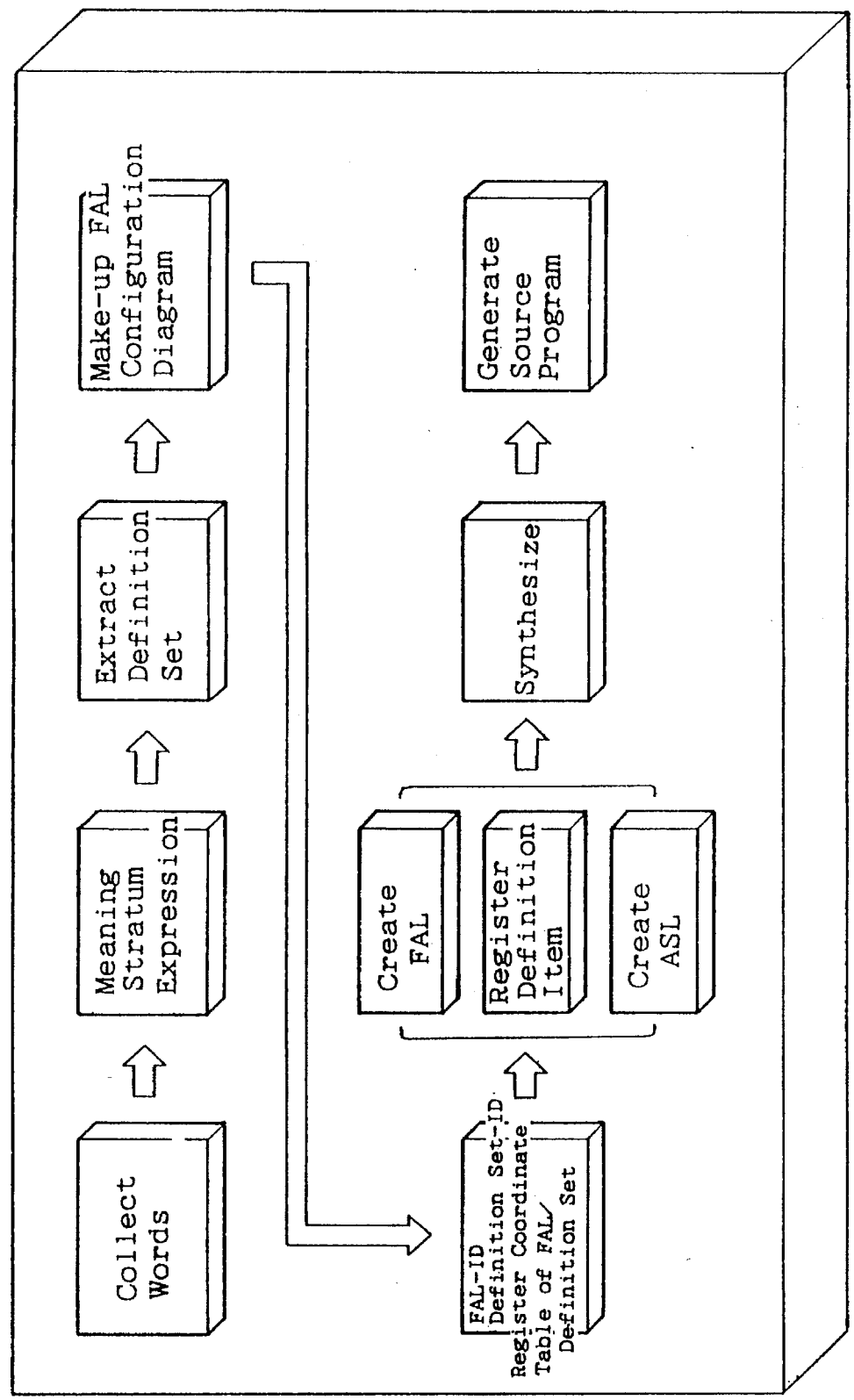
FIG. 4 is a schematic block diagram showing one detailed example of a whole working system based on the program development system according to the present invention.

One example of the whole detailed operation system to perform the above described program is shown in FIG. 4. In this system, words relating to the objective development system are collected without any conditions nor any fixed principles. Then the collected words are classified and related after due consideration of subordinate relationships. Furthermore, the words are ordered according to meaning stratum, expression of words and flow expression between words (relation of words in due consideration of temporal synchronism). The ordered words are expressed by a word directory chart (WDC).

At least one definition set is extracted from the word directory chart. Each control program FAL and the extracted definition set are respectively given a name, and a relative coordination between the control program FAL and the extracted definition set is generated to make up a FAL configuration diagram. This FAL configuration diagram shows a completion of FAL configuration over all system to be developed. In detail, the FAL configuration is configured by a plurality of control programs FAL for each process unit.

Succeedingly, the detailed contents of the control program FAL and the program segment(s) ASL are respectively created and finally synthesized to generate the objective source program.

In the above described operations, some operations such as the extraction of definition set and the creation of FAL configuration diagrams are essentially performed by manual work of the programmer(s). The other operations can be performed by computer aided development works.

Figure 5:
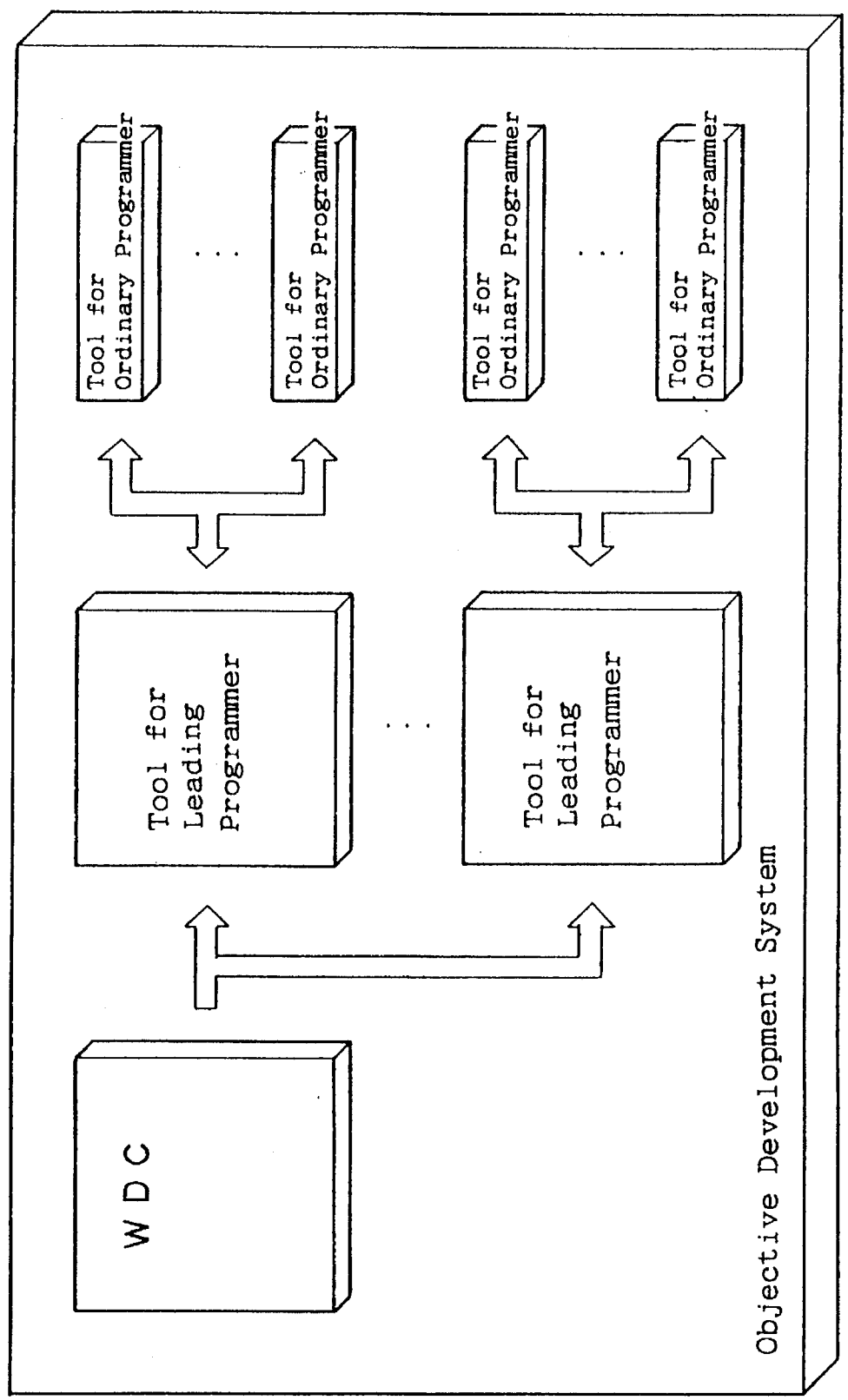
FIG. 5 is a schematic illustration showing one example of a basic structure of the software for aiding the program development system according to the present invention.

Hereinafter, one typical example of a programming method employing at least one computer aided development system will be described. FIG. 5 shows one example of such computer aided development system. FIG. 6 to FIG. 11 show the flowcharts for the computer aided development system.

As shown in FIG. 5, the programmers of this programming method includes at least one leading programmer who controls the program development works and other ordinary programmers who are respectively engaged in individual works under the control of the leading programmer. In practical operation, some tools are provided for the leading programmer and the ordinary programmers. The leading programmer inputs an individual working instruction into a floppy disk through his own tool, and delivers the disk to one of the ordinary programmers. The disk is set in the tool for the ordinary programmer. Then the ordinary programmer executes the instructed work through his own tool with the disk, and inputs the result of the instructed work and returns the disk to the leading programmer. The leading programmer further delivers the disk including the next instruction to the same ordinary programmer. Such reciprocation between the leading programmer and the ordinary programmer is repeated to complete the required operation.

FIG. 5 shows one example including two tools for the leading programmers intending that the same programming work is performed at remote places on the same occasion. The tool for one ordinary programmer belongs to one of the leading programmers, and is independent from the other leading programmer.

The computer aided system shown in FIG. 5, employing two different types of tools one of which is for the leading programmer and the other for the ordinary programmers, provides the following effects.

1) Decentralized processing can be executed.

Stand-alone type hardware units may be configured as an off-line system to perform decentralized processing. The control system under the tool for the leading programmer may provide the same effects as exclusive control through a file system. Since this method can be achieved by at least one stand-alone hardware unit, the development circumstance can be easily prepared.

2) The development for programming systems can be achieved under the responsible control of the leading programmer.

The ordinary programmers are not exclusively engaged in the development work, but work proceeds under instruction from the leading programmer. Since the developed results from the ordinary programmers are collected to the tool for the leading programmer, the leading programmer can always and fully realize the current situation of the development works.

3) The ordinary programmers must be engaged in the only work instructed by the leading programmer.

This method can prevent the ordinary programmers from misunderstanding and confusion with random suggestion, exclusive idea, and so on, so that the programming work can be effectively performed. The resulting work from the ordinary programmer is fully returned to the leading programmer through the hardware means. In other words, the feed-back function between the leading programmer and the ordinary programmer can be completely effected to eliminate the leakage in the report from the ordinary programmer.

Figure 6:
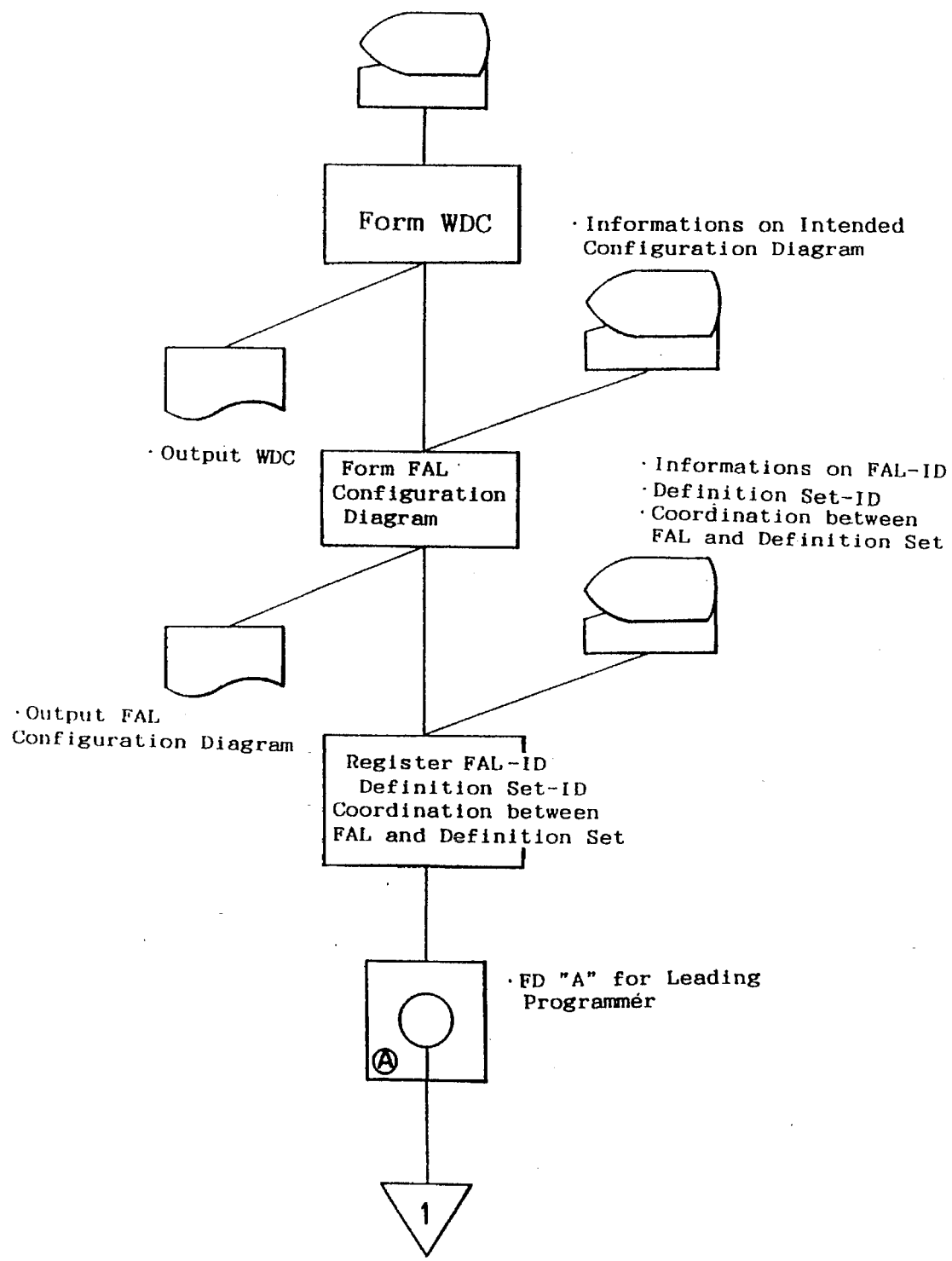
FIG. 6 is a flowchart representing one example of a programming method according to the present invention.

Referring to FIG. 6 to FIG. 11, one typical example of the computer aided development system will be described in detail. First of all, as shown in FIG. 6, various definition items collected and extracted from the objective processing system to be developed are inputted into a tool for a leading programmer (hereinafter referred to as "leader's tool") to generate WDC (word directory chart). The generated WDC can be outputted to a book as necessary at any time. Then various information on the configuration diagram of the intended whole system are inputted into the leader's tool to generate a FAL configuration diagram which can be outputted to the book as necessary. Information on identifications of respective control program FAL to be used and definition sets, and coordination between the respective control program FAL and the definition sets are inputted and registered in the leader's tool. These input information above are saved in a floppy disk A for the leading programmer through the leader's tool.

Figure 7:
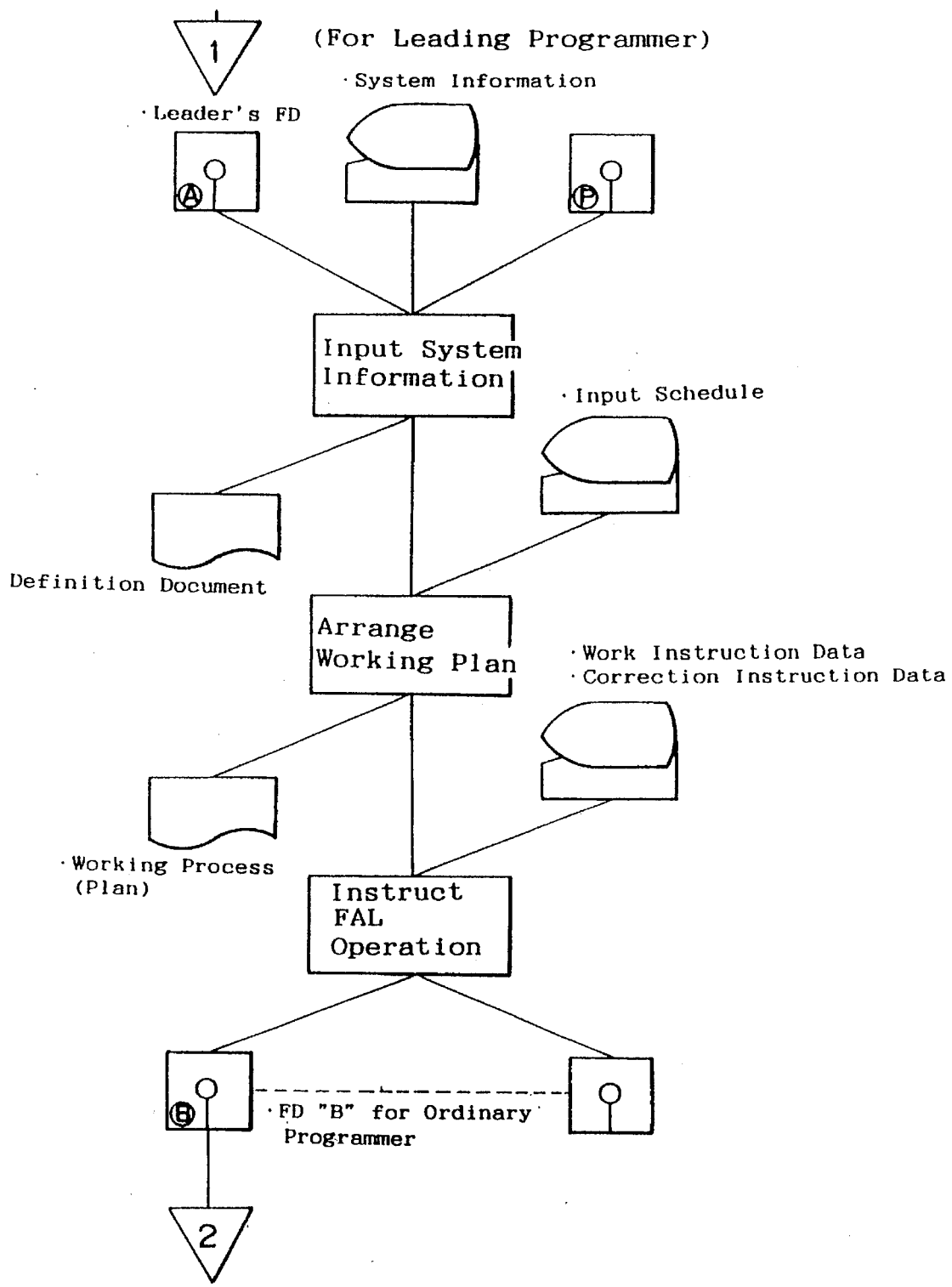
FIG. 7 is a flowchart continued from FIG. 6.

Referring to FIG. 7, system information is inputted into the leader's tool. This input operation is performed by either the required information being copied from the floppy disk A or directly inputted at this stage. Another floppy disk P includes at least one FAL paradigm. Also, such FAL paradigm may be previously stored in the leader's tool or directly input from the other floppy disk P, as shown in FIG. 7. According to the system information, the intended control program FAL and definition set are determined and outputted to the book as necessary. Schedule information for this program development work is inputted into the leader's tool to arrange a working plan for respective ordinary programmers. The arranged working plan and schedule are outputted to the file table as necessary. Then the leading programmer input instructions on the control program FAL and correction work for each ordinary programmer, and makes a floppy disk B for the ordinary programmer. In this floppy disk B, the information data relating to the control program FAL and definition set assigned to each ordinary programmer is saved.

In this embodiment, the FAL paradigm represents a basic form of control program FAL extracted from the divided control program FAL into respective processing units.

Figure 8:
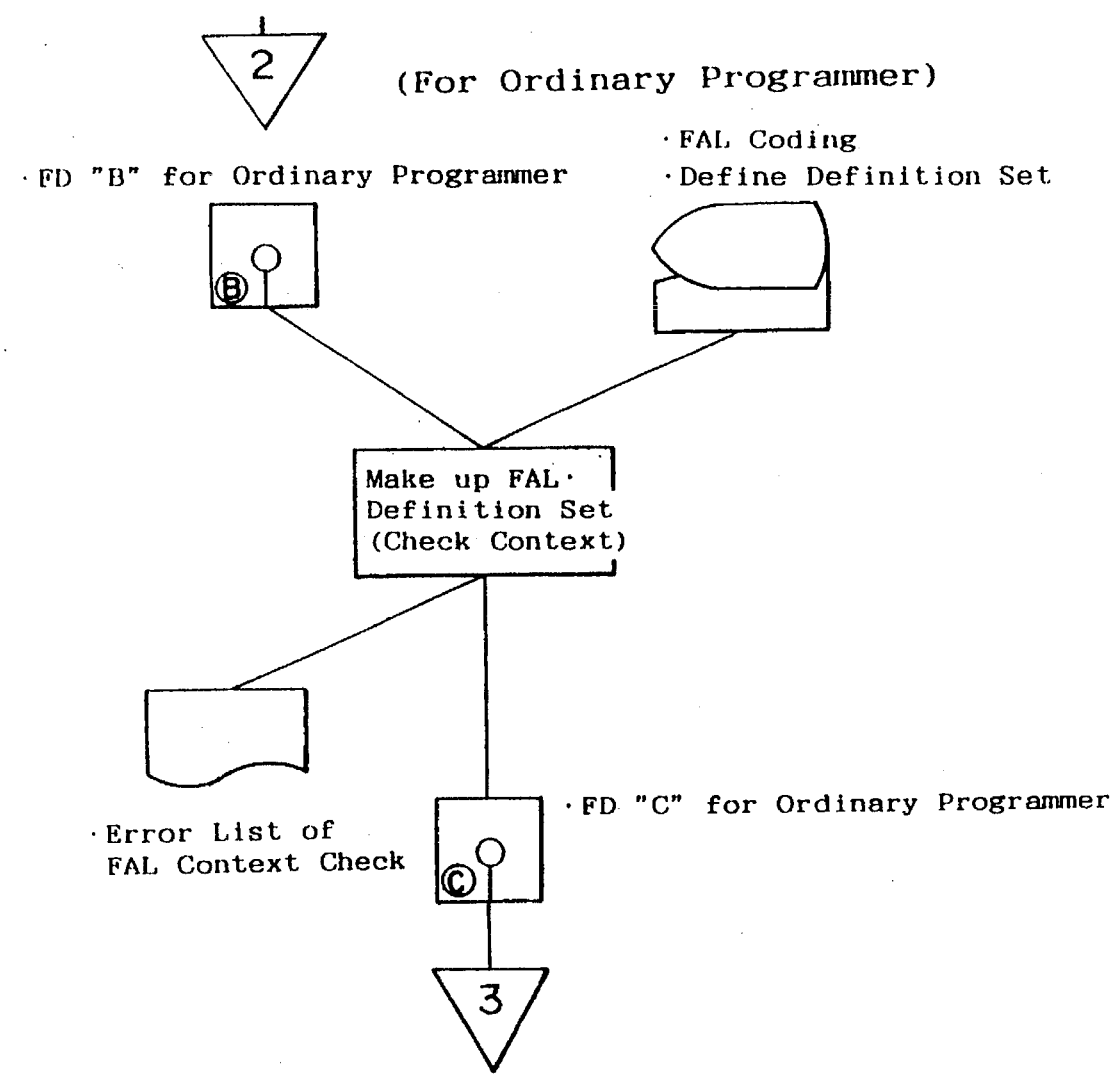
FIG. 8 is a flowchart continued from FIG. 7.

Referring to FIG. 8, the floppy disk B is set in the tool for ordinary programmer so that the ordinary programmer starts to complete the control program FAL and the definition set in response to the instruction recorded in the floppy disk B. In this stage, according to the FAL paradigm designated to each control program FAL, the ordinary programmer inputs individual identification name such as a file name and business peculiar link grammar which designate the definition set or definition items.

One example of the FAL paradigm is shown in FIG. 12. In this FAL paradigm, necessary data is inputted through the screen and the resulting file is output. That is, uncompleted portions of the file name and the business peculiar link grammar are expressed by "?" mark. The ordinary programmer completes these uncompleted portions one by one.

This completed control program FAL is further subjected to a context check operation to find out any errors such as uncompleted definition set in the control program FAL and departure from the rules of this program development method. If any one of errors is detected, the error list of the FAL context check is outputted to the book. After all of the instructed works are completed, the result of the completed work is saved in the floppy disk B. In other words, the content of the floppy disk B is updated by this result and treated as a floppy disk C which is returned to the leading programmer.

Figure 9:
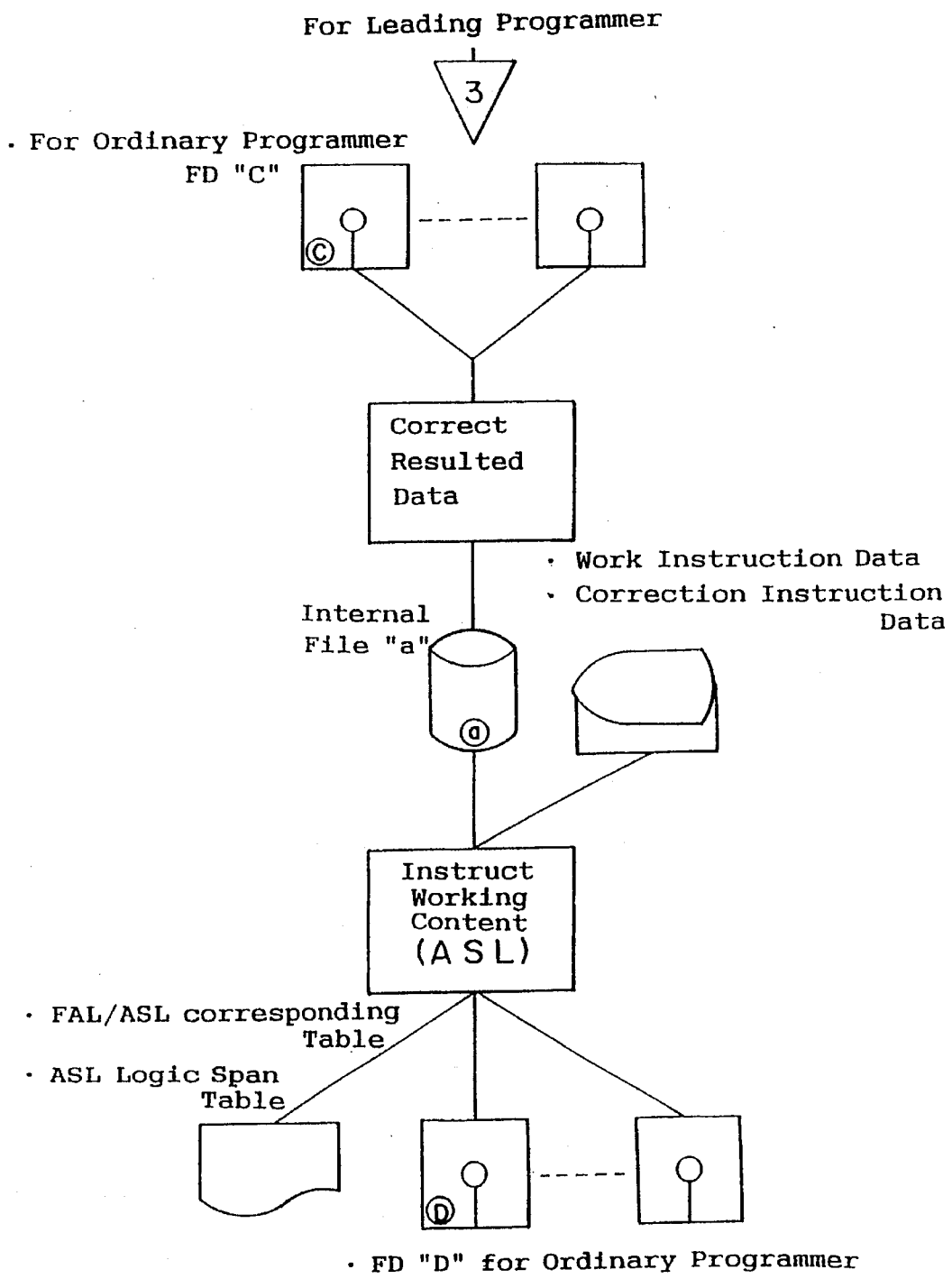
FIG. 9 is a flowchart continued from FIG. 8.

Referring to FIG. 9, the floppy disk C is set into the leader's tool and the resulting content of the disk C is collected and stored in an internal file "a". Next, the leading programmer inputs a work instruction data on program segment ASL and correction instruction data to make up a floppy disk D for each ordinary programmer. At the same time, the leading programmer outputs to the book a FAL/ASL corresponding table which shows the correspondence between one control program FAL and program segment ASL controlled by the control program FAL, and ASL logic span table. These data are delivered to the user to select the necessary program segment ASL for practical development.

The above described ASL logic span table shows various combinations between ASL words for starting (input side) and ending (output side) the program segment ASL designated to each definition item. This ASL word represents the definition item belonging to the designated definition set. For example, if one designated program segment ASL has data operating functions S1, S2, S3, S5, its logic starting point is in coincidence with its logic ending point. This means that they correspond to the same designated definiton item. On the other hand, if one designated program segment ASL has a data operating function S4, its logic starting point is indicated by a user and its ending point corresponds to the designated definition item. Here, the above described data operating functions represent logic segments for the program segments ASL. For example, S1, S2, S3, S4 and S5 represent inspection on input condition, inspection on existence allowance, inspection on identification of logic formula, moving function for processing, and processing function for input/output of definition set, respectively.

Figure 10:
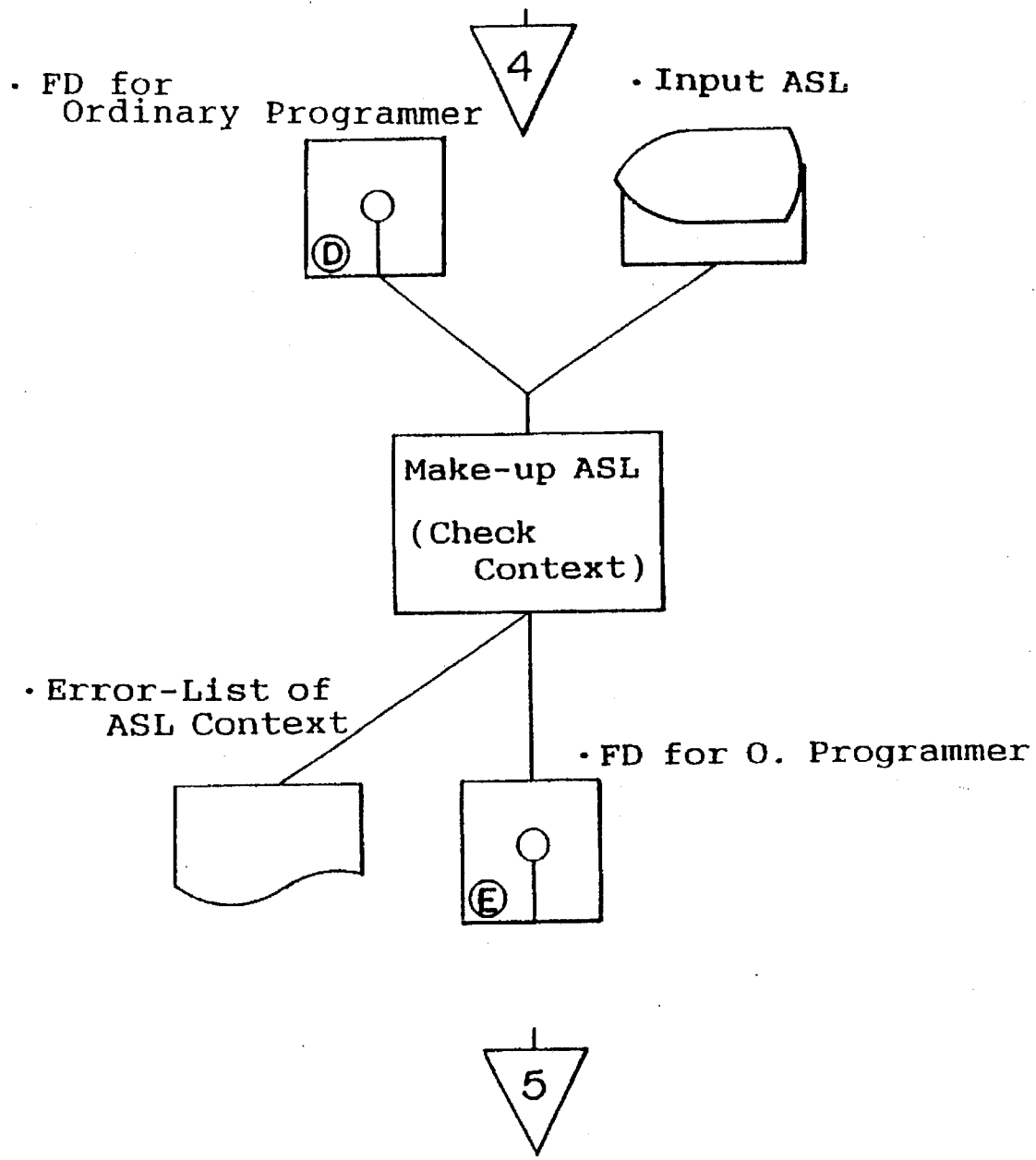
FIG. 10 is a flowchart continued from FIG. 9.

Referring to FIG. 10, the data saved in the floppy disk "D" is transferred to the tool for the ordinary programmer to make up the program segment ASL according to the control program FAL indicated by this floppy disk "D". At this stage, the tool for the ordinary programmer allows an ASL logic span table for each link grammar of each control program FAL to be displayed. Each ASL logic span table shows all definition items attributed to the definition set indicated by the link grammar. There is a possibility of existence of program segments ASL in all definition items for each link grammar. But, it is not required to generate the unnecessary program segment(s) ASL indicated by a user. The generated program segments ASL are subjected to the sme context check as the above described FAL-context check. If any errors are detected, an error-list of ASL context check is output to the book. After all the operation assigned to this ordinary programmer are completed, the resulting content is saved in the floppy disk "D" so that the content stored in the disk "D" is updated by the new data. This new data disk is designated as a floppy disk "E" and this disk is returned to the leading programmer.

Figure 11:
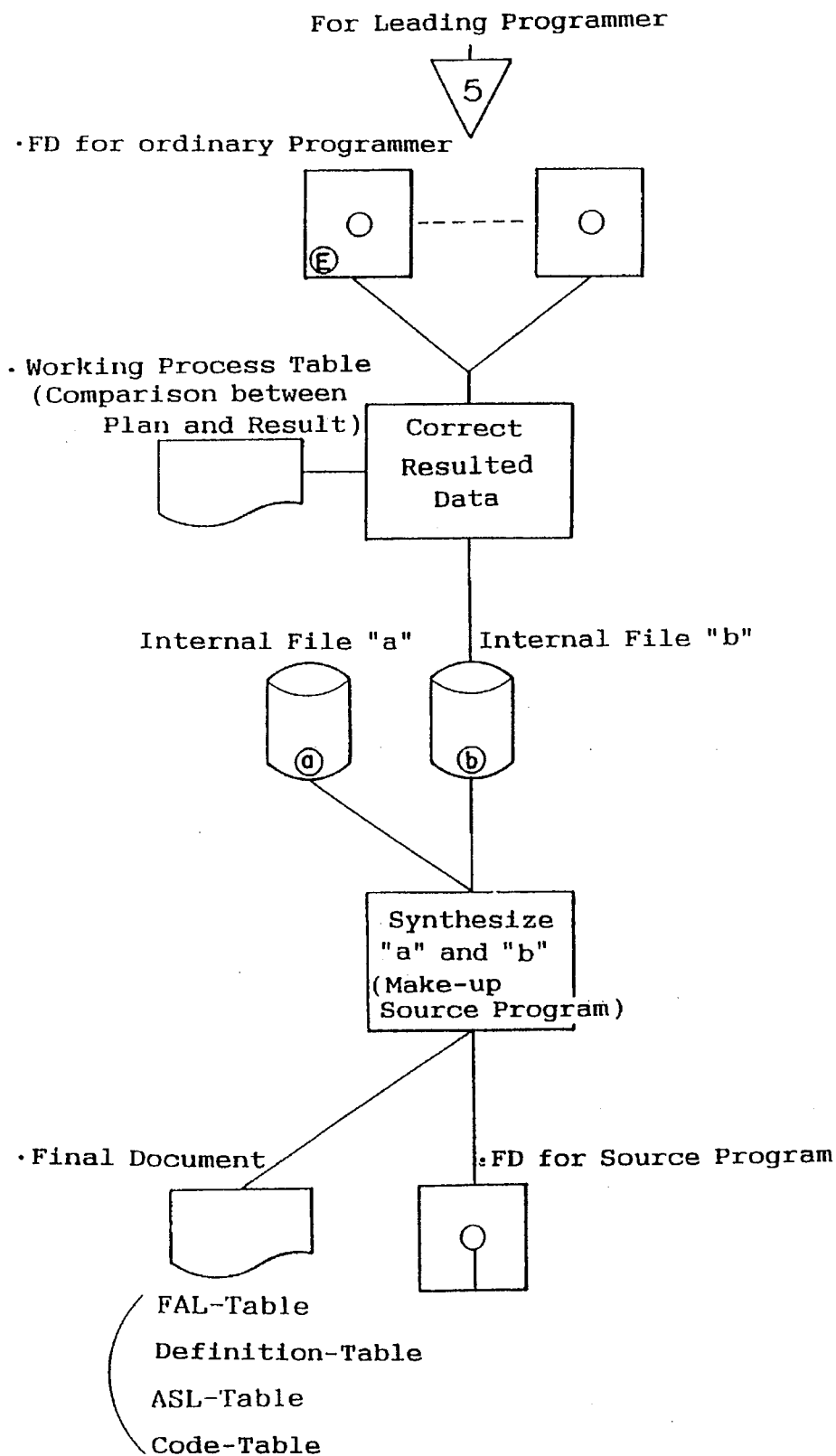
FIG. 11 is a flowchart continued from FIG. 10.

Referring to FIG. 11, the data saved in the floppy disk "E" is transferred to the leader's tool, and then collected and stored in an internal file "b". According to this internal file "b" and the above described internal file "a," including the control programs FAL and the definition sets, the program segments ASL and the control programs FAL are synthesized to make up the desired source program. The resulting source program is saved in a new floppy disk and simultaneously the final documents are output to the book. Since the source program synthesized by these internal files "a" and "b" is represented by the intermediate language between the natural language and the artificial language, the source program should be interpreted into any suitable program language required by a user.

In the above described embodiment, the communication between the leading programmer and the ordinary programmers is performed by delivering some magnetic recording medium such as a floppy disk. This communication may be also established by using a cable network, or any software means separated from each other.

Figures 13, 14:
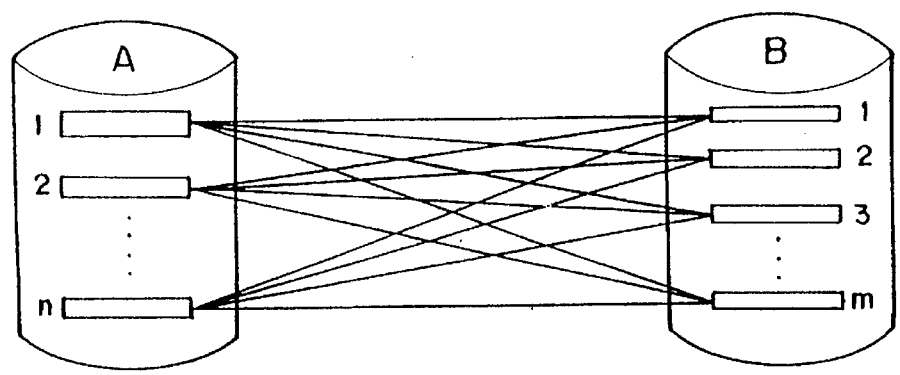
FIG. 13 is a table representing the locational relation of program segment ASL.
FIG. 14 is a schematic illustration showing a typical determination system relating to business parameters by means of commonly used computers.

FIG. 13 shows a table representing locational relation of program segment ASL. In this table, one control program FAL includes "n" link grammars in number "1" to "n", and each link grammar designates one definition set composed of "n" definition item 1 to item "n". All of the program segments ASL used in this control program FAL exist at the cross points defined between the link grammar and the definition items designated by the link grammar. For example, the program segment ASL1, 1 exists at the cross point between the link grammar 1 and the definition item 1; ASL 1, 2 exists at the cross point between the link grammar 1 and the definition item 2; ASL n,n exists at the cross point between the link grammar "n" and the definition item "n". This routine for indicating the possible existences of required program segments ASL allows the programming operation to be completed easily without omission and variation in quality.

Referring to FIG. 14, if operation factors for a computer are represented by relation between input item $A_i (i=1$ to $n)$ and output item $B_j (j=1$ to $m)$, then these operation factors can be determined by satisfying the following relation;

| (A1, B1), | (A2, B1), ..., | (An, B1) |
| (A1, B2), | (A2, B2), ..., | (An, B2) |
| . | . | . |
| . | . | . |
| . | . | . |
| (A1, Bm), | (A2, Bm), ..., | (An, Bm) |

According to the ASL logic span, if any two program segments ASL are selected from (sum of input side definition items sum of output side definition items), the program segments are defined in proportion to a number of multiple permutation. Thus, for each one link grammar, all program segments ASL (operation factors) controlled by one control program FAL can be defined by the representation of all combinations output from the definition items defined by the link grammar.

The link grammar used in the control program FAL is represented by the following formula;

*L, Definition Set–ID, Data Operating Function *

If the required definition items in the definition set are obvious, another formula

*L, Item–ID, Data Operating Function *, for designating only Definition Item-ID may be used.

Figure 15:
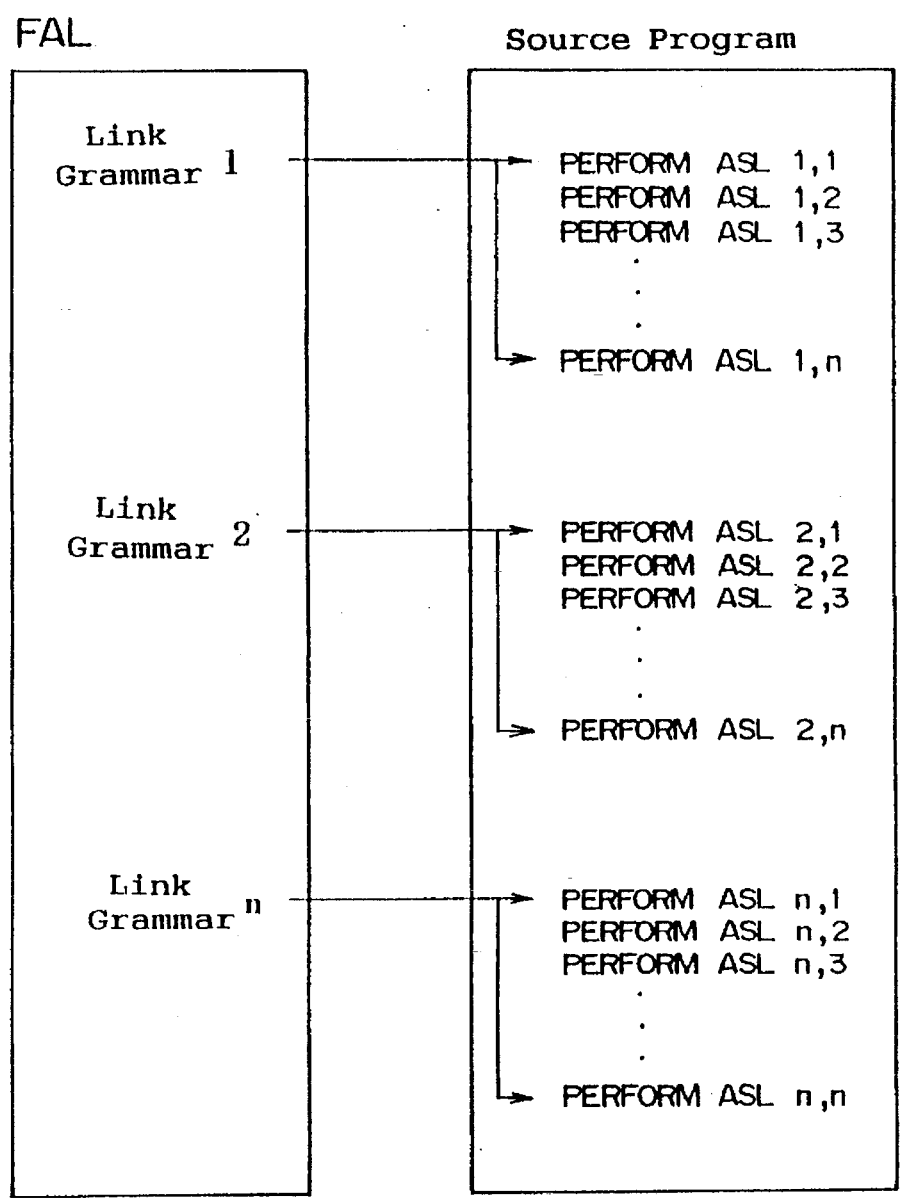
FIG. 15 is a schematic illustration showing a method for taking all program segments ASL into a source program.

This link grammar is replaced by all program segments ASL generated by the link grammar and the designated definition items during synthesizing operation from FAL to source program. FIG. 15 shows this process. In this drawing, the link grammar 1 of FAL(corresponding to FIG. 13) is converted into the source program written in COBOL language as shown below.

```
PERFORM ASL 1, 1
PERFORM ASL 1, 2
PERFORM ASL 1, 3
       .
       .
PERFORM ASL 1, n
```

Accordingly, all program segments ASL are taken into the source program through the link grammars of the control program FAL. "PERFORM" sentence is not formed for uncompleted program segment ASL.

FIG. 16 shows an example of a system for generating a source program written in COBOL language by synthesizing the control program FAL and program segments ASL. In this drawing, the link grammars No. 10, No. 11 and No. 18 of the control program FAL need corresponding program segments ASL, respectively. Thus, plural control segments ASL represented by CS44(C,C), AS32(A,A), DS47(A,D), and ES47(B,E) are generated. These control program FAL and program segments ASL are synthesized to generate the source program shown at the right side in the drawing. In the generated source program, the link grammar of the control program FAL corresponding to the program segment ASL is attached with "PERFORM" sentence for performing the corresponding program segment ASL and a group of ASL is stored in another place in the source program, not shown. When this source program is performed, the designated program segment ASL is read by "PERFORM" sentence.

Since the generated source program includes some link grammars without program segments ASL, the source program can effectively adopt any additional corrections to add new program segments ASL caused by changes in business factors in the future. In detail, the program segments ASL corresponding to the changes may be added to the above empty link grammars.

As disclosed in the above embodiment, since the programming work according to the present invention can be achieved by separating the control program FAL which excludes business data processing logic from the program segment ASL which includes only business data processing logic, respective structures of the control program FAL and program segment ASL are remarkably simplified, and the FAL generating work and the ASL generating work can independently progress. Further, since almost all changes required during program-development or after practical work belong to the business data processing, such changes can be easily performed by only correcting the corresponding program segment ASL.

Since the program segment ASL is generated at the cross point defined between the link grammar of the control program FAL and the definition item to be treated by the link grammar, the programmer will routinely know the program segment ASL to be generated. This allows the programmer to easily perform the ASL programming work without mistakes and fluctuation.

Since the control program FAL is generated in accordance with the FAL-paradigm which is selected from a plurality of predetermined FAL-paradigm, the FAL generating work can be easily standardized and simplified to ensure a uniform programming.

Since each of the program segments ASL and control programs FAL can be independently generated by any systematic control works in combination with a leading programmer for managing the whole programming works and a plurality of ordinary programmers under the control of the leading programmer, these ordinary programmers can effectively create only the required program segment ASL and/or control program FAL program in response to the instruction from the leading programmer.

As many apparently widely different embodiments of this invention may be made without departing from the spirit and scope thereof, it is to be understood that the invention is not limited to the specific embodiments thereof except as defined in the appended claims.

What is claimed is:

1. A method for generating specific program systems to perform administrative data processing functions in specially designated businesses, comprising the steps of;

a) collecting various definition items to be processed in the administrative data processing system;

b) generating program segments ASL (Applicational Segment of Logic), each of which has a single function and related to the definition items as a key-word and independent from the control relation of the other program segments ASL;

c) generating control program FAL (Frame of Applicational Logic) which organizes the plural program segments ASL into an operating and controlled group off program segments ASL; and d) synthesizing the program segments ASL and control program FAL to generate a source program to satisfy the required administrative data processing function.

2. The method according to claim 1, wherein:

a) the control program FAL has at least one link grammar for starting the program segments ASL; and b) each of the program segments ASL is generated at a cross point defined between the link grammar and the definition item to be treated by the link grammar.

3. The method according to claim 2, wherein:

a) the program segment ASL is generated at all possible points of the cross point.

4. The method according to claim 1, wherein:

a) said FAL generating step is performed by parting the control program FAL into plural processing units, and selecting a FAL-paradigm from a plurality of FAL-paradigms previously extracted, which are used for a basic form common to the parted processing units of the control program FAL.

5. Tools for implementing the method of generating specific program systems to perform administrative data processing functions on specially designated businesses, the method comprising the steps of collecting various definition items to be processed in the administrative data processing system, generating program segments ASL (Applicational Segment of Logic) each of which has a single function, and is related to the definition item as a key-word and is independent from the control relation of the other program segments ASL, generating a control program FAL (Frame of Applicational Logic) which combines the plural program segments ASL by operating and controlling a group of the generated program segments ASL, and synthesizing the program segments ASL and control program FAL to generate a source program to satisfy the required administrative data processing function; wherein said tools comprise:

a) a first type for a lead programmer and a second type for an ordinary programmer, said first type tool being used to instruct each ordinary programmer which ASL and/ or FAL to generate and said second type tool being used to perform the ASL and/or FAL generating work instructed by said first type tool and return the result of the instructed work to said first type tool.

6. The tools according to claim 5, and further comprising:

a) a floppy disk for being used in and handed between said first and second tools, said floppy disk including data of the instructed work from said first tool and the generated work from said second tool.

7. The tools according to claim 5, wherein:

a) said first and second tools are operably connected to each other by means of a cable network communication system.

* * * * *